(12) United States Patent
Helms et al.

(10) Patent No.: US 6,344,874 B1
(45) Date of Patent: Feb. 5, 2002

(54) IMAGING SYSTEM USING A DATA TRANSMITTING LIGHT SOURCE FOR SUBJECT ILLUMINATION

(75) Inventors: Richard Morgan Helms, Sunderland; John V. Taglione, Scarboro, both of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/998,182

(22) Filed: Dec. 24, 1997

(30) Foreign Application Priority Data

Dec. 24, 1996 (CA) ............................................. 2194027

(51) Int. Cl.[7] ............................. H04N 5/33; H04N 7/00; H04N 7/14
(52) U.S. Cl. ................. 348/164; 348/14.08; 348/14.16; 348/216; 348/370; 348/552; 396/106
(58) Field of Search ............................... 358/906, 909.1; 396/56, 57, 89, 106, 109; 348/12, 13, 14, 15, 16, 17, 164, 207, 211, 212, 222, 370, 371, 375, 376, 552, 14.01, 14.08, 14.09, 14.16, 216, 217; H04N 5/33, 5/225, 7/14, 5/222, 7/00

(56) References Cited

U.S. PATENT DOCUMENTS

| | | | | |
|---|---|---|---|---|
| 3,748,383 A | * | 7/1973 | Grossman | 348/164 |
| 4,843,461 A | * | 6/1989 | Tatsumi | 348/13 |
| 5,077,784 A | * | 12/1991 | Fujita | 348/14 |
| 5,565,919 A | * | 10/1996 | Wakabayashi | 348/375 |
| 5,634,144 A | * | 5/1997 | Mauro | 396/106 |
| 5,973,730 A | * | 10/1999 | Tranchita | 348/164 |
| 6,023,292 A | * | 2/2000 | Wakui | 348/211 |

* cited by examiner

Primary Examiner—Wendy R. Garber
Assistant Examiner—Ngoc-Yen Vu
(74) Attorney, Agent, or Firm—Ronald L. Drumheller

(57) ABSTRACT

The invention provides an imaging system including a camera with an image sensor sensitive to light and a light emitter with the camera to transmit image data from the camera. It includes a controller to control the light emitter to illuminate a subject in the field of view of the camera.

16 Claims, 5 Drawing Sheets

IMAGING SYSTEM USING A DATA TRANSMITTING LIGHT SOURCE FOR SUBJECT ILLUMINATION

FIELD OF THE INVENTION

The present invention relates generally to imaging systems that use light sources such as infrared light for the purposes of transmitting image information from a camera to another device such as a computer system incorporating a light receiving device adapted to receive data.

BACKGROUND OF THE INVENTION

Video cameras are used with computers for capturing images for uses such as video conferencing or storage. One difficulty in using a video camera in a typical office is caused by lighting. Offices often have overhead lighting which creates undesirable shadows that result in unsatisfactory image pickup.

Most digital or video cameras use a CCD (Charge Couple Device) as an electronic sensor to capture an image. Depending on the material of the CCD, it may have a wide radiometric spectrum ranging from blue (400 Nm) up to mid-infrared (2400 Nm) (the visible spectrum is from 380 to 780 Nm).

The most recent development in communication between computers and other data processing systems has been the use of infrared light to transfer data between the systems. Infrared transceiver communication systems are used to connect workstation computers, lap-top computers to each other and to other data handling system such as printers in the form of local access networks (LANs). These infrared LANs can provide similar capabilities to wired LANs without requiring wire connections. In addition, infrared communications have been adapted to transmit imaging data obtained by digital or video cameras to data processing systems such as computers for the purposes of video conferencing or further processing of the images.

Many companies have adopted the standards proposed by the IrDA (Infrared Data Association™) for the transmission and reception of data using infrared light. The infrared light wave lengths adopted for use under the IrDA guidelines is 870 nm. This is in the near infrared range (close to the visible spectrum). We have found that many CCD video cameras will respond to the infrared light near this wavelength. Infrared emitting LED's (Light Emitting Diodes) are readily available that transmit infrared light in the same region and also can provide suitable infrared sources.

We have found that the following video cameras will respond readily to infrared light in this region:
1. Connectix QuickCam™ from Connectix Corp. Connectix mounts and infrared filter in front of the CCD of the QuickCam video camera to filter out Infrared (IR) light. This is removed to permitted it to respond to IR light.
2. GBC CCD-506 from CCTV Corp. is a typical CCD based low light black and white surveillance camera.
3. Sony Video 8 Camcorder Cameras in Low Light Conditions While human vision can handle a wide latitude of light intensity (dark vs bright areas), CCDs are fairly limited. This creates problems when capturing an image of a person especially using overhead lighting. Dark shadows appear under the eyebrows. While the human eye differentiates these as only shadows, a CCD camera may see them as virtually black due to its limited ability to handle contrast.

The solution most used by the photographers to solve this problem is to provide an additional light source at or near the camera to illuminate the subject. This floods the subject with light minimizing the impact of overhead or poor lighting and reduces the contrast range of the lighting to permit satisfactory imaging.

In video conferencing or other applications which use live video, the image must be captured by the camera and sent to a computer or other data processing system. As discussed previously, one technique for communicating from camera to a computer (such as a PC) is to use infrared light.

SUMMARY OF THE INVENTION

We have found that it is possible to use the infrared light source that is used to transmit the image information from a video camera or a digital camera to a computer can also be used to illuminate the subject satisfactorily. The present invention provides an imaging system that can illuminate the subject satisfactorily with light such as infrared light from its infrared transmission source that is used to transmit information from the camera to an image recording or data processing system. Advantageously the system will include camera such as a video camera having an image sensor sensitive to visible and infrared light. A light emitting device such as an infrared LED (or an LED operating in the visible spectrum) is associated with the camera in order to transmit image data output from the camera. Preferably, the light emitting device is adapted to emit light or infrared light in a divergent beam.

Advantageously, the Light Emitting Device is positionable with respect to the camera so that it can illuminate a subject with its light within the field of view of the camera. Advantageously, the light emitting device can be positioned on the camera to project light forwardly to the subject or can be incorporated in a separate device which is connected to the camera and aimed at the subject in order to provide illumination.

In one aspect of the invention, a controller is provided for controlling the light emitter to transmit image data to the recording or data processing system at the same time as an image is being captured by the image sensor of the camera.

In another aspect of the invention, the controller can be adapted to permit the camera to capture an image at the same time as transmitting data of an image previously captured. Additional infrared light (such as in the form of false data) can be added to the transmission to provide improved illumination of the subject if required.

The infrared emitter can be mounted on the camera to point in the same direction as the lens.

Normally the camera will be used in conjunction with another unit of image processing or data processing equipment such as a computer which will itself have an infrared transceiver. The infrared transceiver of the computer can also be adapted to illuminate a subject being photographed by suitable placement thereof as will be understood readily by those skilled in the art.

Generally, in its broadest form, the invention uses the same infrared transceiver or emitter that is used for communication between camera and an auxiliary unit with which it is in communication to provide illumination of a subject being photographed so that there will be sufficient subject illumination for successful imaging.

When the infrared emitter of the camera is used to illuminate the subject at the same time as it is transmitting image data conservation of energy is achieved as no extra energy need be expended on illumination. This will enable the camera, which is typically battery powered, to be used for a longer period of time on each charge, or if powered from the mains will achieve it a reduction in energy expense.

A BRIEF DESCRIPTION OF THE DRAWINGS

Additional features of the invention will be more readily apparent from the following detailed description and claims when taken in conjunction of the drawings in which;

DESCRIPTION OF THE PREFERRED EMBODIMENTS OF THE INVENTION

Figure 1:
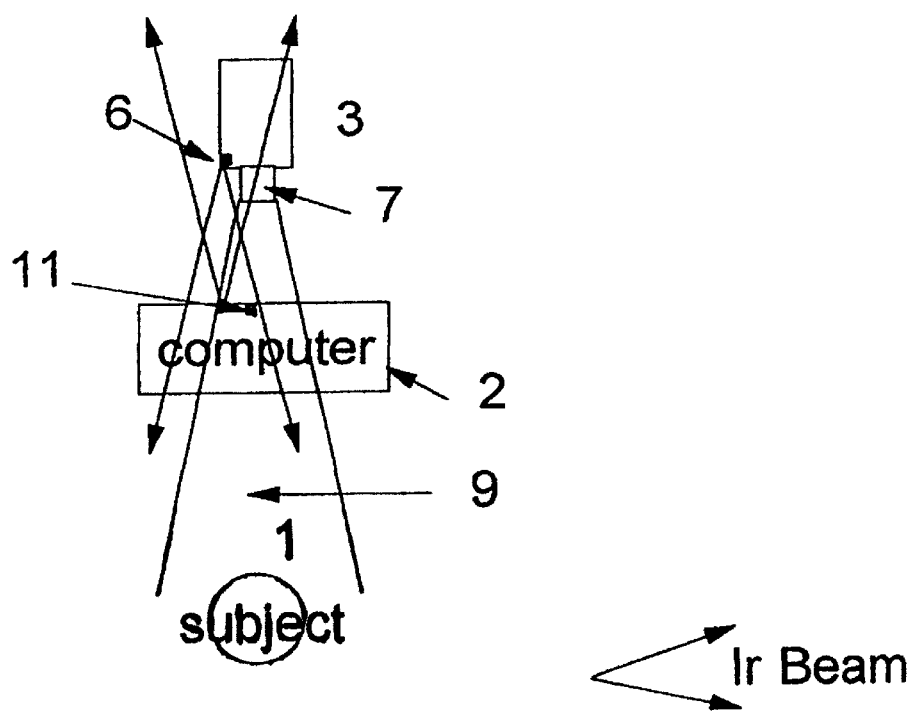
FIG. 1 is a top view of block diagram of one embodiment of the invention in which the auxiliary unit (computer) is placed between the subject and the camera.
Figure 2:
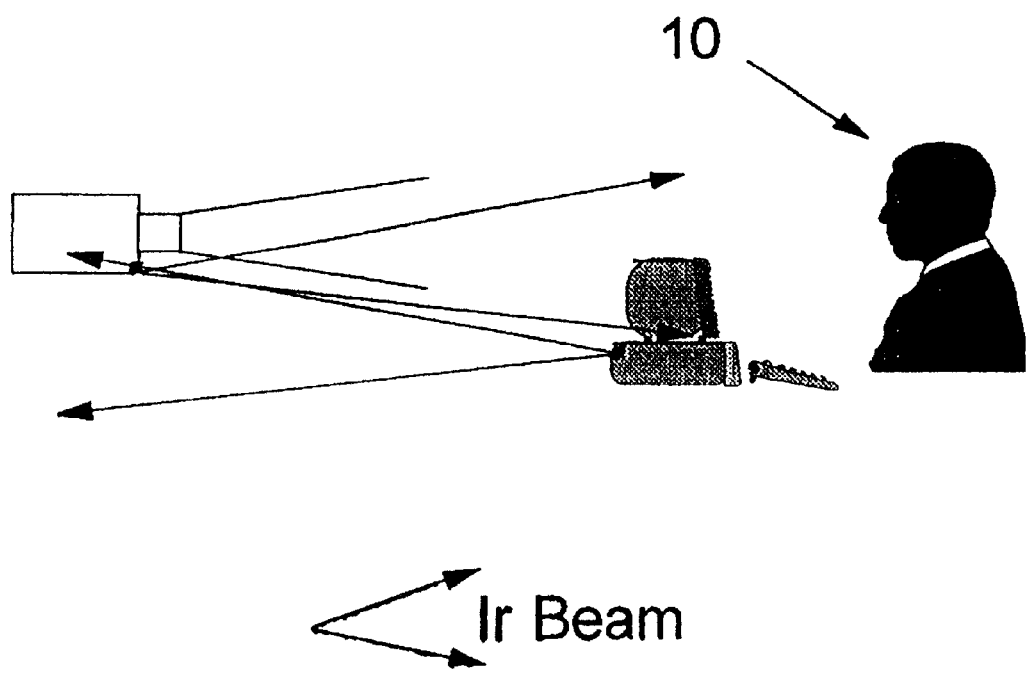
FIG. 2 is a side view of the same embodiment of the invention.

Referring to FIG. 1 and FIG. 2, there is shown one embodiment of the invention which the a camera (3) is aimed both at the auxiliary unit (computer (2)) and the subject (1) who may also be operating the computer 2. In this scenario, the camera 3 is capturing pictures of the operator and sending them to the computer. The communications between the camera and the computer is by an infrared link such as IrDA link in which an IR transceiver 6 on the camera is sending image data to an IR transceiver 11 at the computer or auxiliary unit (2) by means of infrared transceiver (6) on the unit.

In a traditional setup not incorporating the advantages of the invention, a light is placed over the camera aimed at the face of the person to overcome shadows created by overhead or otherwise poor lighting.

In the method of the invention, the camera (3) is aimed at both the person (1) and the computer (2). The field of view 9 of the lens (7) of the camera is typically aimed to capture the face 10 of the subject (1). The infrared emitter of the transceiver is typically an LED associated with the camera which may be on the front of the camera as illustrated in FIGS. 1 and 2 or tethered to the camera. In both instances, it is aimed both at the face of the person and the computer (2). This is possible when an IrDA conforming LED is used. An IrDA conforming LED is required to have at least a 15 degree cone of coverage off the centre access in the direction of emission. This results in a cone of coverage of at least 30 degrees. The LED will still provide some illumination outside of the 30 degree cone but to a lesser amount.

Referring to a system equipped to communicate using IrDA transmission protocol, in order to send a picture from the camera (3) to computer (2), the controller of the camera (which need not be shown), turns the LED on and off in a predefined data transmission pattern as defined in the IrDA standard. This can be obtained from the IrDA Association at P.O. Box 3883, Walnut Creek, Calif. 94598. As will be appreciated by those skilled in the art, the amount or quantity of the infrared light illuminating the face or subject can be calculated based on the data stream structure and data sent. Additional light can be transmitted, which we will call "false data", that does not need to conform to communications standards (and preferably will not conform to the communications standards to avoid miscommunication) can be sent if additional light is needed to illuminate the subject. If this data does not conform to the communications standards of the IrDA, this data will be rejected by the computer as it is not in the correctly defined data stream. The additional data will provide additional illumination to the subject as can be appreciated.

The process of capturing an image by the camera and the transmission of the image to computer can be appreciated as a two-step operation. These two steps can be concurred or sequential.

If the image capture is concurrent with the transmission of the previously captured image, the quality of the image capture can be affected by the variation or irregularity in the emission and infrared intensity of the IR emitter due to the data pattern being transmitted. For instance, if the image being transmitted has a large amount of dark areas then a proportionally larger amount of infrared data or energy is transmitted, and conversely if data for the light portion of an image is being transmitted there will be proportionally less infrared radiation available to illuminate the subject. This may occur if the exposure rate of the camera is shorter than the time required to transmit the image. In an NTSC conforming video signal, the capture rate used in 30 images per second. Under higher lighting conditions, the exposure of the camera will be much shorter than one-thirtieth of a second. The result may be that sequential images will be exposed with different light intensities and the image observable transmitted by the camera will exhibit a flashing or strobe effect. In this situation, the camera will require a means for adjusting the exposure on a frame-by-frame basis to compensate for this effect. This can be achieved electronically by processing the image obtained by the camera, which may require additional processing circuitry in the camera or to be associated with the image transmission being processed.

If the exposure used by the camera is long enough, then the amount of infrared data should be sufficient to result in consistent illumination, but there may be a residual effect dependent on the data sent caused by the image being photographed by the camera.

As previously indicated, if the exposure rate of the camera is shorter than the time required to transmit the image, a flashing or strobe effect may result. This strobe effect caused by the varying light emitted from the LED, can be corrected by controlling the intensity of the LED light source emissions during image capture. This will most easily be achieved if the functions of image capture and image transmission are done sequentially. In many video conferencing or image capture systems, the capture rate is much slower than an NTSC system, with typical rates of 15 frames per second or less. These systems allow more time for image transmission versus this image capture.

The intensity of the LED light source can be controlled by changing the duty cycles of the LEDs used or by changing their current levels. With a higher duty cycle or a higher current, more infrared light will be emitted. This can be done by an intensity control circuit or controller associated with the IR transceiver. In the case of an image that is larger or contains more details or image intensity levels, there is more data being transmitted and therefore likely to be more infrared light available for illumination. A larger image implies that more pixels are being recorded and thus more data will be required for transmission providing more illumination.

A typical video camera includes a processor which can and is used to control exposure, timing, aperture, and such.

Typically the processor is preprogrammed at the manufacturer with its own firmware. For the purposes of this invention, the processor or an auxiliary controller can be used to control the amount of illumination emitted by the LEDs and also the timing of the illumination as will be well appreciated by those familiar with the video camera or digital camera technology.

At a rate of 15 frames per second, an image must be transmitted once every 67 milliseconds. In this time period, a 32 kilobyte image of 320×200 pixels with 16 gray levels can be sent using a four megabyte per second infrared link (4 Mbps) [in conformity with the IrDA association standards]. If the exposure time is however; in the one millisecond range, it is then possible to have non-overlapping exposure and transmission (ie sequential exposure and transmission) at 15 frames per second using a 4 Mbps infrared link. It is possible to support larger image sizes with more levels as the frame rate will be correspondingly decreased if the same infrared link transmission rate is used.

With an exposure time of 1 millisecond, it is possible to control the infrared light source to emit a burst of infrared light for the period of the exposure by turning it on independently of the data transmission. In that case it will behave like a flash unit.

We have found that using image transmission data to illuminate the subject while the camera is sending the picture to the computer will provide sufficient illumination for the next image capture. We have found that this results in good illumination for a black and white camera, as described in the poor of lighting situation with no additional LED power or additional lighting required.

There are a number of video cameras available that have 0.3 lumen sensitivity and it has been found that the invention herein provides good results with these cameras.

Figure 3:
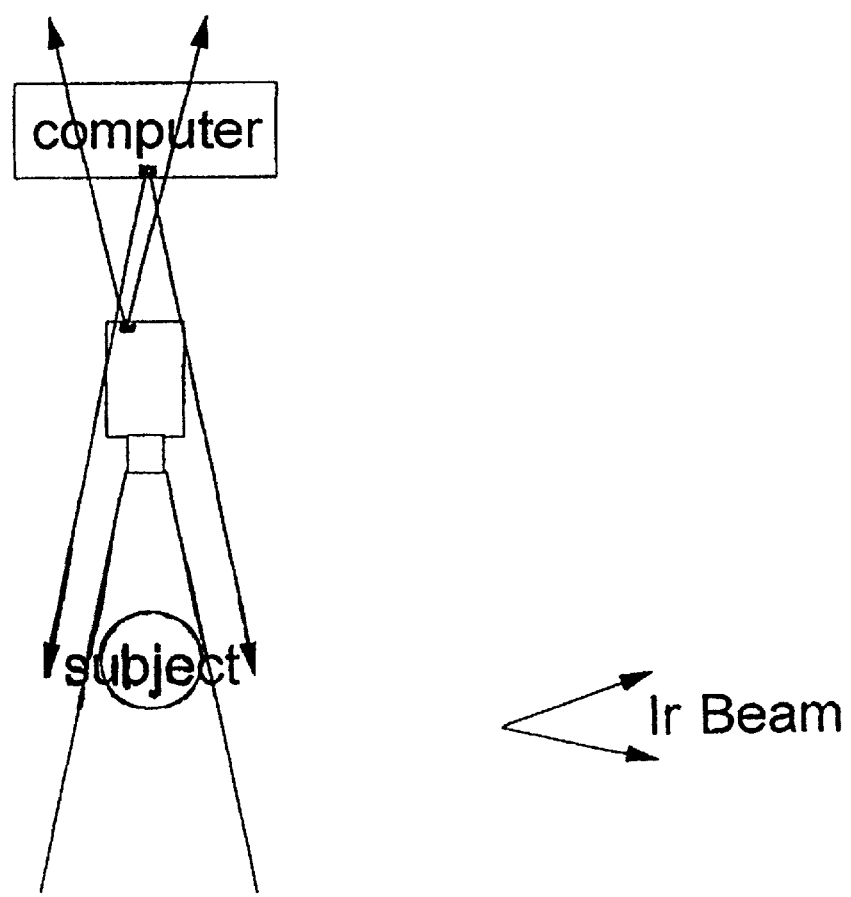
FIG. 3 is a top view of another embodiment of the invention in which the camera is located in front of the auxiliary unit.
Figure 4:
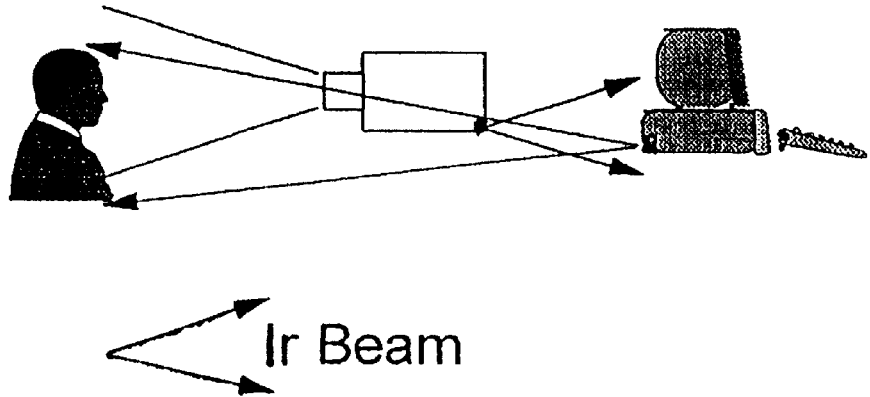
FIG. 4 is a side view of the embodiment of FIG. 3.

In addition, as depicted in FIGS. 3 and 4, if the camera is positioned between the subject and the computer and the computer 2 is provided with an infrared transceiver 11 which projects infrared light towards the camera 3 and thus incidentally towards the person being photographed by the camera, the infrared transceiver used by the computer 11 can be used to illuminate the subject in similar manner. In this instance, it is presumed that the infrared transceiver of the camera is position to accept and transmit infrared data to the rear towards the computer.

As has been mentioned previously, it is possible to use infrared transceivers which are tethered either to the camera or computer and can thus be positioned to provide illumination towards the subject depending on the position of the camera or computer as described in relation to FIGS. 1 and 2 and, 3 and 4 in a similar manner.

Figure 5:
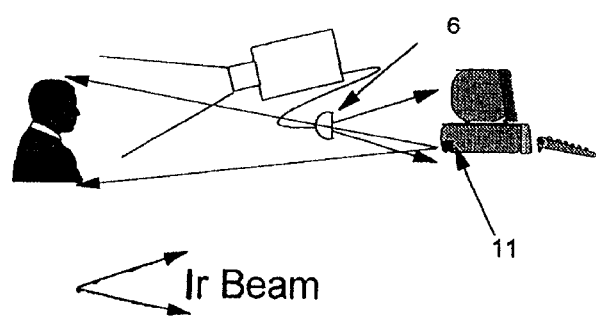
FIG. 5 is another embodiment of the invention illustrating the use of the invention with a tethered infrared transceiver associated with the camera unit.

FIG. 5 illustrates such a system in which the tethered transceiver 6 illuminates the computer 2 while the computer transceiver 11 illuminates the subject. While this description has described the invention in detail in relation to video cameras, we have found that it applies as well to digital still cameras that are sensitive in the near infrared range as well as using infrared communication to transmit information to a recording unit or data processing system.

The invention works best with monochrome or black and white camera systems which have formed the basis of our development efforts.

While the invention has been described in conjunction with imaging systems using infrared communication, it will be appreciated that other light communication system to which the camera sensors of the system are sensitive may also be used.

Although this invention has been described in terms of use of infrared emitters, transmitters or LEDs, it will be readily appreciated that LEDs or other emitters operating in the visible light spectrum may provide similar capabilities where those LEDs are used in a high speed light communication system similar to the infrared system which has been described.

While the present invention has been described with reference to a few specific embodiments, the description is illustrative of the invention and is not to be construed as limiting the invention. Various modifications to the invention may be made by those skilled in the art without departing the true spirit and scope of the invention as defined by the appended claims.

The embodiments of the invention in which an exclusive property or privilege is claimed are defined as follows:

1. An imaging system comprising:
   a camera having an image sensor for receiving image light and producing image data in response thereto;
   a light emitter associated with the camera for transmitting the image data from said camera to a receiver, said light emitter producing emitted light within the range of sensitivity of said image sensor;
   control means for controlling said light emitter to produce emitted light while said camera is receiving said image light;
   said light emitter providing illumination within the field of view of said camera for producing at least a portion of said image light received by said image sensor.

2. The imaging system of claim 1 in which said light emitter emits infrared light.

3. The imaging system of claim 2 in which said light emitter is associated with said camera to project a beam of infrared light forwardly of the camera within the field of view of the camera.

4. The system of claim 2 in which said control means is adapted to cause said light emitter to illuminate a subject with infrared light while transmitting data with said infrared light.

5. The imaging system of claim 2 in which the control means is adapted to cause said light emitter to transmit image data and capture an image at different times.

6. The imaging system in accordance with claim 1 in which said control means is adapted to permit said camera to capture an image at the same time as transmitting data of a previously captured image.

7. The imaging system in accordance with claim 1 in which said control means is adapted to permit said camera to capture an image at the same time as transmitting said image data of said image by said light emitter.

8. The system of claim 4 which said light emitter is positioned on said camera.

9. The system of claim 4 in which said light emitter is attached to said camera by a flexible coupling so that it can be positioned in different directions with respect to the camera.

10. A method of providing illumination for a subject photographed by a camera having an image sensor, said camera having light emitting means for transmitting image data from said camera to an auxiliary device, said method comprising the step of directing light emitted by said light emitting means towards said subject to provide illumination of said subject while said subject is being photographed.

11. The method of claim 10 in which said subject is photographed by said camera and said image data is transmitted to said auxiliary unit sequentially.

12. The method of claim 10 in which said subject is photographed by said camera and said image data is transmitted to said auxiliary unit simultaneously.

13. The method of claim 10 wherein the light emitting means emits infrared light.

14. An imaging system comprising:

a camera having an image sensor for receiving image light and producing image data in response thereto;

a first light transceiver associated with the camera for transmitting the image data from said camera to a second transceiver associated with an auxiliary unit, said first and second light transceivers producing emitted light within the range of sensitivity of said image sensor;

control means for controlling one of said light transceivers to produce emitted light while said camera is receiving said image light;

said one light transceiver providing illumination within the field of view of said camera for producing at least a portion of said image light received by said image sensor.

15. The imaging system of claim 14 wherein said one light transceiver is the first light transceiver.

16. The imaging system of claim 14 wherein said one light transceiver is the second light transceiver.

* * * * *